US007856501B2

(12) United States Patent
Marr et al.

(10) Patent No.: US 7,856,501 B2
(45) Date of Patent: Dec. 21, 2010

(54) NETWORK TRAFFIC PRIORITIZATION

(75) Inventors: James E. Marr, Burlingame, CA (US);
Yutaka Takeda, San Mateo, CA (US);
Attila Vass, Foster City, CA (US);
Payton R. White, Foster City, CA (US);
Stephen C. Detwiler, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 186 days.

(21) Appl. No.: 12/267,233

(22) Filed: Nov. 7, 2008

(65) Prior Publication Data

US 2009/0144423 A1    Jun. 4, 2009

Related U.S. Application Data

(60) Provisional application No. 60/992,295, filed on Dec. 4, 2007, provisional application No. 60/992,282, filed on Dec. 4, 2007.

(51) Int. Cl.
*G06F 15/16* (2006.01)
(52) U.S. Cl. .................. 709/226; 709/223; 709/228; 713/154; 370/231
(58) Field of Classification Search ................. 709/203, 709/206, 224, 228, 227, 240; 370/231, 352; 713/154
See application file for complete search history.

(56) References Cited

U.S. PATENT DOCUMENTS

| | | | |
|---|---|---|---|
| 5,313,454 A * | 5/1994 | Bustini et al. ............. 370/231 |
| 6,247,061 B1 * | 6/2001 | Douceur et al. ........... 709/240 |
| 6,452,923 B1 * | 9/2002 | Gerszberg et al. ......... 370/352 |
| 6,480,748 B1 * | 11/2002 | Gerszberg et al. ......... 700/21 |
| 6,546,016 B1 * | 4/2003 | Gerszberg et al. ......... 370/401 |
| 6,661,799 B1 | 12/2003 | Molitor |
| 6,760,775 B1 | 7/2004 | Anerousis et al. |
| 6,799,255 B1 | 9/2004 | Blumenau et al. |
| 6,934,745 B2 | 8/2005 | Krautkremer |
| 7,016,942 B1 | 3/2006 | Odom |
| 7,426,185 B1 | 9/2008 | Musacchio et al. |
| 7,529,193 B2 | 5/2009 | Zimmerman et al. |
| 2002/0049841 A1 | 4/2002 | Johnson et al. |
| 2002/0075844 A1 | 6/2002 | Hagen |
| 2003/0223430 A1 | 12/2003 | Lodha et al. ............. 370/395.41 |

(Continued)

FOREIGN PATENT DOCUMENTS

FR    2829648    3/2003

(Continued)

OTHER PUBLICATIONS

U.S. Appl. No. 60/992,295, filed Dec. 4, 2007.

(Continued)

*Primary Examiner*—Khanh Q Dinh
(74) *Attorney, Agent, or Firm*—Joshua D. Isenberg; JDI Patent

(57) ABSTRACT

Prioritizing network traffic among two or more distinct channels of communication within a single application in a node configured to communicate with one or more other nodes over a network is disclosed. For a particular time quantum, a bandwidth quantum may be distributed amongst two or more communication channels according to priorities associated with those channels.

30 Claims, 4 Drawing Sheets

U.S. PATENT DOCUMENTS

| | | | |
|---|---|---|---|
| 2004/0024879 A1 | 2/2004 | Dingman et al. | |
| 2004/0139228 A1 | 7/2004 | Takeda et al. | |
| 2005/0105526 A1 | 5/2005 | Stiemerling et al. | |
| 2005/0251577 A1 | 11/2005 | Guo et al. | |
| 2005/0259637 A1 | 11/2005 | Chu et al. | |
| 2005/0262411 A1 | 11/2005 | Vertes | |
| 2006/0075127 A1 | 4/2006 | Juncker et al. | |
| 2006/0209822 A1 | 9/2006 | Hamamoto | |
| 2006/0288103 A1 | 12/2006 | Gobara et al. | |
| 2007/0058792 A1 | 3/2007 | Chaudhari et al. | |
| 2007/0061460 A1 | 3/2007 | Khan et al. | |
| 2007/0081459 A1 | 4/2007 | Segel et al. | |
| 2007/0217436 A1 | 9/2007 | Markley et al. | |
| 2008/0298376 A1 | 12/2008 | Takeda et al. | 370/400 |
| 2009/0013175 A1* | 1/2009 | Elliott | 713/154 |
| 2009/0077245 A1 | 3/2009 | Smelyansky et al. | |
| 2009/0094370 A1 | 4/2009 | Jacob et al. | |
| 2009/0138610 A1 | 5/2009 | Gobara et al. | |
| 2009/0144423 A1* | 6/2009 | Marr et al. | 709/226 |
| 2009/0144424 A1 | 6/2009 | Takeda et al. | 709/226 |
| 2009/0144425 A1* | 6/2009 | Marr et al. | 709/226 |
| 2009/0240821 A1 | 9/2009 | Juncker et al. | |

FOREIGN PATENT DOCUMENTS

| | | |
|---|---|---|
| WO | WO2004063843 | 7/2004 |
| WO | WO2005088466 | 9/2005 |
| WO | WO 2009/073312 | 6/2009 |

OTHER PUBLICATIONS

U.S. Appl. No. 60/992,282, filed Dec. 4, 2007.
"DCNET Internet Clock Service", IETF RFC 778, Apr. 18, 1981, David L. Mills.
"DCN Local-Network Protocols", IETF RFC 891, Dec. 1983, David L. Mills.
"Algorithms for Synchronizing Network Clocks", IETF RFC 956, Sep. 1985, David L. Mills.
"Network Time Protocol (NTP)", IETF RFC 958, Sep. 1985, David L. Mills.
"Network Time Protocol (Version 3)", IETF RFC 1305, Mar. 1992, David L. Mills.
"Simple Network Time Protocol (SNTP) Version 4", IETF RFC 2030, Oct. 1996, David L. Mills.
"User Datagram Protocol" in IETF RFC 768, Aug. 28, 1980, J. Postel.
"Cell Broadband Engine Architecture", Aug. 8, 2005, IBMC, SCEI, Toshiba Corporation.
Invitation to Pay Additional Fees and, Where Applicable, Protest Fee dated Apr. 7, 2009 for International Patent Application No. PCT/US2008/083002.
The International Search Report and The Written Opinion of the International Searching Authority dated Jul. 7, 2009 issued for the International Patent Application No. PCT/US2008/083002.
Office Action dated Jun. 24, 2010 issued for U.S. Appl. No. 12/267,269.
Arno Wacker et al - "A NAT Traversal Mechanism for Peer-to Peer Networks" - Eighth International Conference on Peer-to Peer Computing (P2P'08), 2008. IEEE. pp. 81-83.
Jim Dowling et al. - "Improving ICE Service Selection in a P2P System using the Gradient Topology" - First International Conference on Self-Adaptive and Self-Organizing Systems (SASO 07), 2007, IEEE, pp. 285-288.
European Search Report dated Jan. 28, 2010 issued for European patent application No. 99252219.2.
J. Rosenberg, Simple Traversal of UDP Through Network Address Translators (NAT), BEHAVE Inernet-Draft, Jul. 17, 2005.
J. Rosenberg, Interactive Connectivity Establishment (ICE): A methodology for Network Address Translator (NAT) Traversal for Offer/Answer Protocols, MMusic Internet-Draft, Jul. 17, 2005.
F. Audet, NAT Behavioral Requirements for Unicast UDP, BEHAVE Internet -Draft, Jul. 15, 2005.
J. Rosenberg, Interactive Connectivity Establishment (ICE): A Methodology for Network Address Translator (NAT) Traversal for Multimedia Session Establishment Protocols, MMusic Internet -Draft, Oct. 25, 2004.
J. Rosenberg, Traversal Using Relay NAT (TURN), MIDCOM Internet-Draft, Oct. 20, 2003.
Y. Takeda, Symmetric NAT Traversal Using STUN, Internet Engineering Task Force, Jun. 2003.
J. Rosenberg, Interactive Connectivity Establishment (ICE): A Methodology for Network Address Translator (NAT) Traversal for Offer/Answer Protocols, MMusic Internet-Draft, Jan. 16, 2007.
J. Rosenberg, Interactive Connectivity Establishment (ICE): A Methodology for Network Address Translator (NAT) Traversal for Multimedia Session Establishment Protocols, MMusic Internet-Draft, Jul. 19, 2004.
J Rosenberg, STUN- Simple Traversal of User Datagram Protocols (UDP) Through Network Address Translator (NATs), Network Working Group, Mar. 2003.
Office Action dated Mar. 24, 2010 issued for U.S. Appl. No. 12/235,409.
Final Office Action dated Jul. 19, 2010 issued for U.S. Appl. No. 12/235,409.
Final Office Action dated Apr. 12, 2010 issued for U.S. Appl. No. 11/243,853.
Office Action dated Oct. 13, 2009 issued for U.S. Appl. No. 11/243,853.
Office Action dated Aug. 31, 2010 issued for U.S. Appl. No. 11/243,853.
Final Office Action dated May 28, 2009 issued for U.S. Appl. No. 11/243,853.

* cited by examiner

NETWORK TRAFFIC PRIORITIZATION

CLAIM OF PRIORITY

This application claims the priority benefit of commonly-assigned, co-pending U.S. Provisional Patent application No. 60/992,295 to James E. Marr, Yutaka Takeda, Attila Vass, Payton White and Stephen C. Detwiler entitled "NETWORK TRAFFIC PRIORITIZATION" filed Dec. 4, 2007, the entire disclosures of which are incorporated herein by reference.

This application claims the priority benefit of commonly-assigned, co-pending U.S. Provisional Patent application No. 60/992,282 to Yutaka Takeda, James E. Marr, Stephen C. Detwiler, Attila Vass, and Payton White entitled "NETWORK BANDWIDTH DETECTION AND DISTRIBUTION" filed Dec. 4, 2007, the entire disclosures of which are incorporated herein by reference.

CROSS-REFERENCE TO RELATED APPLICATIONS

This application is related to commonly-assigned, co-pending U.S. patent application Ser. No. 12/267,269 to James E. Marr, Yutaka Takeda, Attila Vass, Payton White and Stephen C. Detwiler entitled "NETWORK BANDWIDTH DETECTION, DISTRIBUTION AND TRAFFIC PRIORITIZATION" filed the same day as the present application, the entire disclosures of which are incorporated herein by reference.

This application is related to commonly-assigned, co-pending U.S. patent application Ser. No. 12/267,254 to Yutaka Takeda, James E. Marr, Stephen C. Detwiler, Attila Vass, and Payton White entitled "NETWORK BANDWIDTH DETECTION AND DISTRIBUTION" filed the same day as the present application, the entire disclosures of which are incorporated herein by reference.

FIELD OF THE INVENTION

The present invention relates to computer network communication, and more specifically to prioritizing network traffic among distinct channels of communication within a single application.

BACKGROUND OF THE INVENTION

Computing systems are becoming increasing interconnected through network environments. Such network environments may be centralized or decentralized. A decentralized computing environment may be defined by a number of computing systems interconnected to communicate with one another, wherein each computing system can perform both client and server functions. A peer-to-peer (P2P) network represents an example of a decentralized computing environment in which each computing system within the P2P network is defined as a peer of every other computing system within the network. For discussion purposes, each peer computing system within the P2P network is referred to as a node. Additionally, each node within the P2P network may be configured to execute software having substantially equivalent functionality. Therefore, each node may act as both a provider and a user of data and services across the P2P network. Peer to peer networks are distributed data networks without any centralized hierarchy or organization. Peer to peer data networks provide a robust and flexible means of communicating information between large numbers of computers or other information devices, referred to in general as nodes.

A P2P network relies primarily on the computing power and bandwidth of the participants in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology.

P2P applications often involve a significant amount of communication between nodes over different communication channels. By way of example, such channels may include an audio channel, a video channel, and a file transfer channel. A given application, e.g., audio-video (A/V) chat may communicate using all three channels. Typically, an application has a limited amount of network bandwidth available for communication. The application distributes the available bandwidth among the communication channels.

Prior art network implementations involving multiple communication channels typically adopt an "all or nothing" approach that can lead to starvation. For example, consider a very low bandwidth situation where a user is attempting to engage in A/V chat involving transmission of captured audio and video frames. If the user does not have enough bandwidth available to transmit all of the captured audio and video frames, prior art techniques typically gives complete priority to the audio frames and not transmit any video frames. This may reduce quality of service for the A/V chat.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
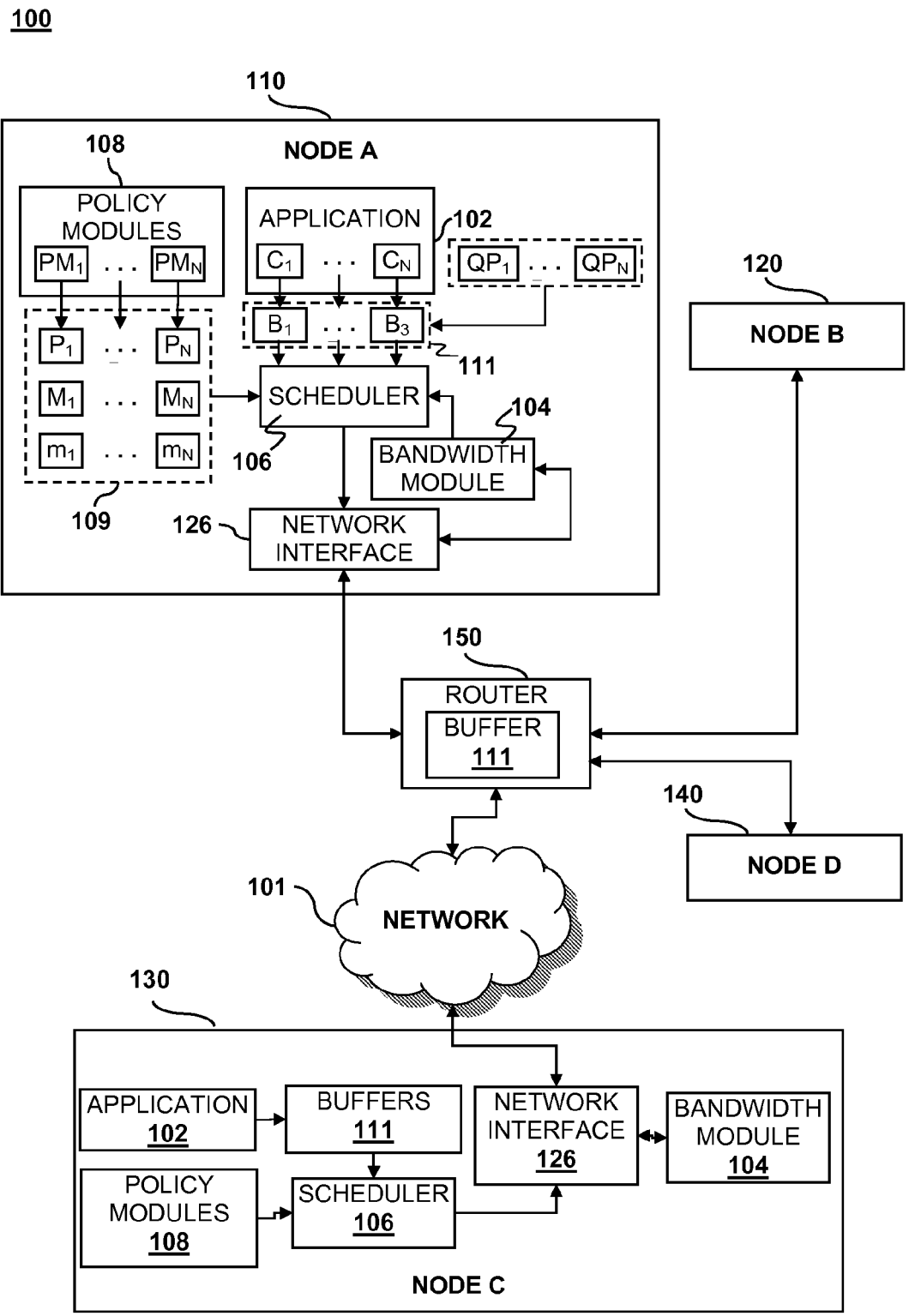
FIG. 1 is a block diagram of networked devices illustrating prioritization of network traffic according to an embodiment of the present invention.

According to embodiments of the present invention, bandwidth starvation issues may be avoided by prioritizing network traffic among distinct channels of communication within a single application. FIG. 1 depicts a flow diagram of a method 100 for prioritizing network traffic among two or more distinct channels of communication within a single application in a node configured to communicate with one or more other nodes over a network. Embodiments of the present invention may be understood by referring to FIG. 1 and FIG. 2.

As seen from FIG. 1, several nodes, e.g., Node A 110, Node B 120, Node C, 130 and Node D 140 may be configured to communicate over a network 101. Each node may include a network interface 126 to facilitate communication over the network 101. Two or more nodes, e.g., Node A 110 and Node B 120 may be behind a router 150. Two or more nodes may run an application 102 that allows the two nodes two communicate over two or more distinct channels $C_1 \ldots C_N$, where N is greater than or equal to 2. Each channel represents a different mode of communication of data traffic. The data for each mode communication may be formatted differently from that of the others. Examples of "channels" include, but are not limited to, audio streams, video streams, file transfer, drawing commands on a shared whiteboard, or any other bulk classification of data traffic. By way of example, and without loss of generality, the application 102 may be an audio-video (A/V) chat application involving audio, video and file transfer channels.

Each node 110, 120, 130, 140 may include a bandwidth module 104, which may be implemented in software or hardware. The bandwidth module 104 is responsible for estimating the available bandwidth for communication with the other nodes. For example, if Node A 110 is participating in audio video chat with Node C 130 and Node D 140, the bandwidth module estimates the available bandwidth Node A 110 has for communication with Node C 130 and Node D 140. Similarly, the bandwidth module 104 at Node C 130 may estimate the available bandwidth node C 130 has for communication with Node A 110 and Node D 140. In embodiments of the present invention, it is desirable to have accurate bandwidth estimates. A specific example of a bandwidth detection module is described in commonly assigned US Provisional Patent Application 60/992,282, to Yutaka Takeda et al, entitled NETWORK BANDWIDTH DETECTION AND DISTRIBUTION. Network traffic prioritization may be implemented by a scheduler 106 running on one of the nodes, e.g., Node A 110. The scheduler 106 may be implemented in software, hardware, or some combination of software and hardware. By way of example, and without loss of generality, the scheduler 106 may be programmed with instructions that implement a method 200 for prioritizing network traffic illustrated in FIG. 2.

Figure 2:
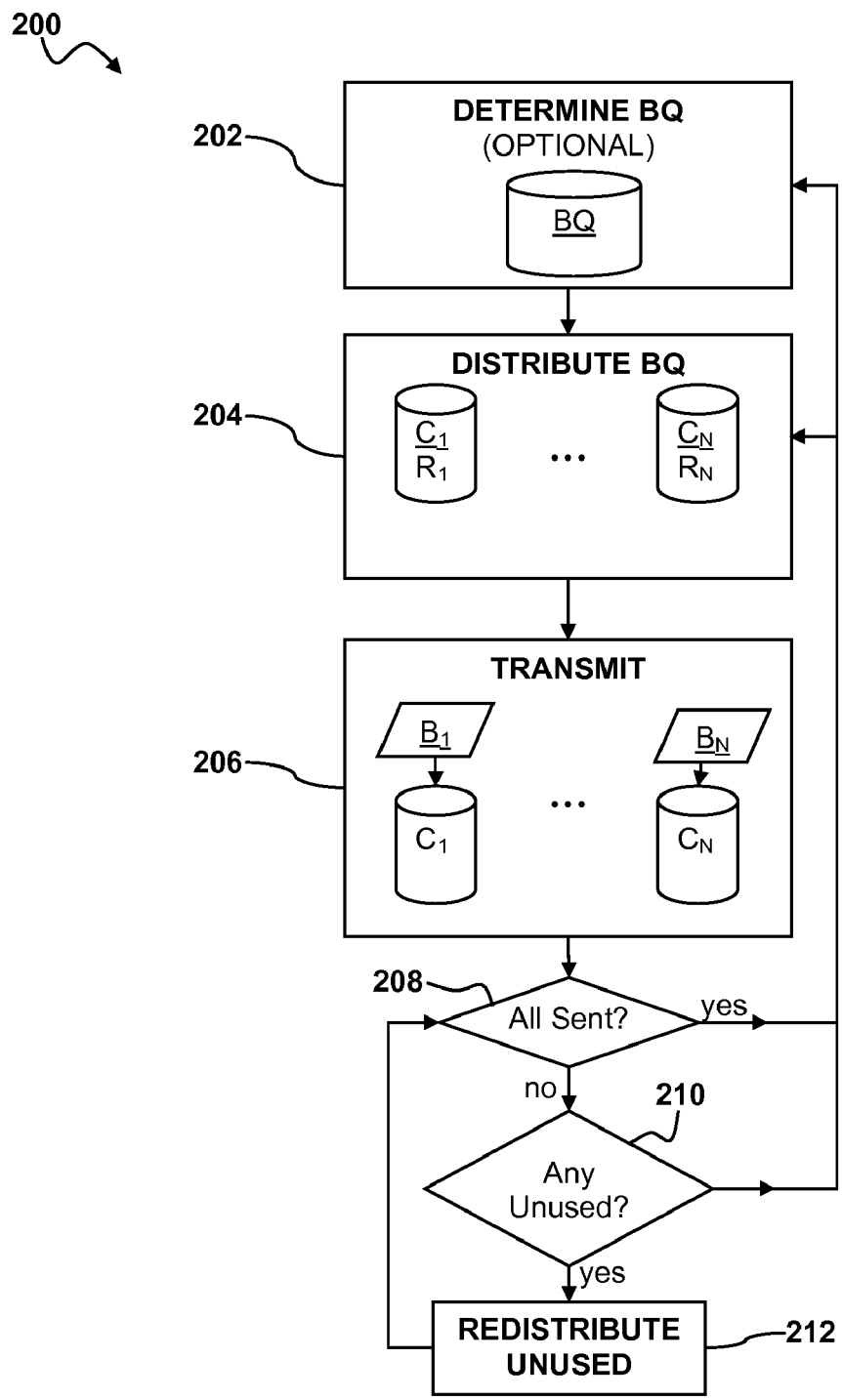
FIG. 2 is a flow diagram illustrating a method of for prioritizing network traffic according to an embodiment of the present invention.

As seen from FIG. 2, at 202 a bandwidth quantum BQ may be determined for a given time interval referred to herein as a time quantum T. Although the choice of time quantum T is somewhat arbitrary, certain considerations are worth bearing in mind when choosing the size of the time quantum T. For example, a smaller time quantum will be more sensitive to isolated bandwidth changes. A longer time quantum will smooth sudden changes, but will result in the system taking longer to adjust to sudden, large changes. The bandwidth quantum BQ is a total amount of data (e.g., in kilobits (Kb)) that may be transmitted during the time quantum T. The bandwidth quantum BQ may be determined from a known or estimated bandwidth available for communication with a given node, e.g., as obtained from the bandwidth module 104. The bandwidth quantum BQ may be determined from an estimated bandwidth, e.g., in kilobits per second (Kbps) and the duration of the time quantum T. By way of example, the bandwidth quantum BQ may be determined from a product of a bandwidth estimate and the duration of the time quantum T. As a specific numerical example, suppose that the duration of the time quantum T is 50 milliseconds and the bandwidth module 104 in Node A 110 determines that 500 Kbps of bandwidth are available for communication between Node A 110 and Node C 130 and that 200 Kbps of bandwidth are available for communication between Node A 110 and Node D 140. The bandwidth quantum BQ for communication between Node A 110 and Node C 130 may be approximately (500 Kbps)(50 ms)=25 kilobits (Kb). Similarly, the bandwidth quantum BQ for communication between Node A 110 and Node D 140 may be approximately (200 Kbps)(50 ms)=10 kilobits (Kb).

The scheduler 106 may be configured to implement the distribution of the bandwidth quantum BQ amongst the available channels $C_1 \ldots C_N$. Referring again to FIG. 2, at 204 the bandwidth quantum BQ is distributed amongst the communication channels $C_1 \ldots C_N$, based on priorities $P_1 \ldots P_N$ correspondingly assigned to the channels $C_1 \ldots C_N$. The channels are assigned corresponding reserved portions of the bandwidth quantum BQ. The size $R_i$ of the reserved portion assigned to a given channel $C_i$ of the N channels $C_1 \ldots C_N$, is greater than zero. The size $R_i$ may be determined based on the corresponding priority $P_i$ assigned to the given channel $C_i$. For example, the size $R_i$ of a given reserved portion may be determined by:

$$R_i = BQ \cdot \frac{P_i}{\sum_j P_j}, \text{ where } \sum_j P_j$$

is a sum of the priorities $P_1 \ldots P_N$ for all of the channels $C_1 \ldots C_N$.

The quantity $$\frac{P_i}{\sum_j P_j}$$

is sometimes referred to herein as the relative priority $P_{rel}^i$ for channel $C_i$.

The scheduler 106 may distribute the bandwidth quantum BQ according to priorities assigned by one or more policy modules 108. By way of example, the policy modules 108 may include individual policy modules $PM_1 \ldots PM_N$ for each of the communication channels $C_1 \ldots C_N$. The policy modules 108 may generate policy parameters 109 that the scheduler 106 uses to determine the distribution of the bandwidth quantum BQ amongst the channels $C_1 \ldots C_5$. The parameters 109 may include priorities $P_1 \ldots P_N$. The policy modules 108 may assign priorities $P_1 \ldots P_N$ based on the needs of the application 102. The priorities $P_1 \ldots P_N$ determine how the bandwidth quantum BQ is shared between the communication channels $C_1 \ldots C_N$. Such "bandwidth distribution" may be implemented at some fixed frequency (e.g., 50 Hz in some implementations) by the scheduler 106. At regular intervals, the scheduler 106 may obtain a bandwidth estimation from the bandwidth module 104, determine the bandwidth quantum BQ and divide the bandwidth quantum BQ between the communication channels $C_1 \ldots C_N$ based on their priorities $P_1 \ldots P_N$.

As a numerical example, assume the bandwidth module 104 estimates a bandwidth BW of 200 kbps for a certain connection. Further suppose that a software designer has configured the scheduler 106 to assign a priority $P_1=100$ to an audio channel $C_1$, a priority $P_2=20$ to a video channel $C_2$ and a priority $P_3=5$ to a file transfer channel $C_3$. If scheduler 106 is configured to trigger at 50 Hz, the time quantum T is approximately 20 milliseconds. By multiplying the estimated bandwidth BW by the time quantum T one obtains a bandwidth quantum BQ=200 Kbps×0.02 s=4 kb. From the priorities $P_1$, $P_2$ and $P_2$ of 100, 20 and 5 one may calculate relative priorities of $P_{rel}^1=100/125=0.8$, $P_{rel}^2=20/125=0.16$ and $P_{rel}^3 10/125=0.04$. Thus, for this distribution cycle, audio is assigned a portion $R_1=3.2$ Kb, video is assigned a portion $R_2=0.64$ Kb and file transfer is assigned a portion $R_3=0.16$ Kb.

The priorities $P_1 \ldots P_N$ may be assigned to the communication channels $C_1 \ldots C_N$ based on the nature and type of data being transmitted over the channels. For example, in the context of A/V chat, nature of streaming audio data may dictate that an audio channel be assigned a relatively high priority than streaming video data. Specifically, streaming audio tends to be relatively tolerant to packet loss. Streaming audio also tends to use a relatively constant amount of bandwidth (e.g., about 12 Kbps) compared to either video or file transfer. Streaming video data tends to use a relatively wide range of bandwidth, e.g., about 100-300 Kbps depending on compression, and is tolerant to packet loss. Streaming video tends to be less constant than audio. As a result, a streaming video channel may be assigned a lower priority than a streaming audio channel. File transfer data tends to be unpredictable and intermittent and uses as much bandwidth as is available. Unlike audio and video channels, a file transfer channel could theoretically use an infinite amount of bandwidth if it were available. File transfer data is intolerant to packet loss. File transfer data may be significantly less time insensitive than either video or audio data. Consequently, file transfer data channels may be assigned a significantly lower priority than streaming video channels.

Furthermore, priorities may be assigned based on other considerations, e.g., economic considerations. For example, the data channels $C_1 \ldots C_N$ may include one or more channels devoted to advertising data. The priorities assigned to such advertising channels may be based partly on rates that advertisers are willing to pay to have their advertisements distributed by the nodes. Specifically, within the scheduler 106, selected ones of the priority modules $PM_1$. $PM_N$ associated with advertising channels may be configured to assign a higher priority if a higher advertising rate has been paid.

In addition to priorities, each policy module $PM_1 \ldots PM_N$ may determine maximum values $M_1 \ldots M_N$ and minimum values $m_1 \ldots m_N$ for the portions of the bandwidth quantum BQ that are corresponding assigned to channels $C_1 \ldots C_N$. Such maximum and minimum values may be regarded as a subset of the policy parameters 109. Generally, for a given channel $C_i$, $m_i<M_i$. Maximum and minimum values may be used to tailor the distribution of the bandwidth quantum BQ at 204 to the needs of the application. The maximum and minimum values may have any suitable value. A given minimum value may be as low as zero. A given maximum may be infinite. In some cases, the scheduler 106 may initially assign a give channel $C_i$ a portion that has a size $R_i$ greater than its corresponding maximum value $M_i$. In such a case, the scheduler 106 may be configured, e.g., by suitable programming, to distribute the difference between $R_i$ and $M_i$ amongst the remaining channels. For example, if a channel $C_1$ has a maximum bandwidth portion $M_1$ of 5 Kb and its portion $R_1$ is 8.5 Kb. The difference, 8.5 Kb−5 Kb=3.5 Kb, may be distributed amongst the remaining channels, e.g., on a pro-rata basis dependent on relative priority. For example, suppose there are only two other channels $C_2$ and $C_3$ with relative priorities $P_2^{rel}=0.4$ and $P_3^{rel}=0.1$. The distributor 106 may split up the remaining 3.5 Kb as follows. Channel $C_2$ could be allocated an amount equal to $$3.5 \text{ Kb} \cdot \frac{0.4}{0.4+0.1} = 2.8 \text{ Kb}$$

in addition to its regular portion $R_2$ of the bandwidth quantum BQ. Similarly, channel $C_3$ could be allocated $$3.5 \text{ Kb} \cdot \frac{0.1}{0.4+0.1} = 0.7 \text{ Kb}$$

in addition to its regular portion $R_3$ of the bandwidth quantum BQ.

If a given communication channel $C_i$ has a minimum bandwidth quantum portion $m_i$, all channels of a lower priority that $C_i$ may be excluded from bandwidth distribution at 204 during the time quantum T until a minimum amount of data $m_i$ has been transmitted by the channel $C_i$. If more than one channel has a minimum, the bandwidth quantum is initially distributed to the highest priority channel with a minimum and any other channels having a higher priority. It is important to select the minimum values $m_1 \ldots m_N$ carefully in order to avoid bandwidth starvation. The minimum amount of data $m_i$ represents a minimum amount of data to be sent by the channel $C_i$ during the time quantum T. The minimum value may also be thought of as an expected minimum size of data to send. It is possible that the provided minimum value may be a best guess, and more or less data could actually be available to send. For example, a channel for audio data may always use close to 12 Kbps, so 12 Kbps may be set as the minimum value $m_i$ for that channel. However, depending on the compression used, the actual amount of data may be slightly below 12 kbps at times or slightly over 12 kbps.

Furthermore the policy modules $PM_1 \ldots PM_N$ may generate parameters associated with queuing policies $QP_1 \ldots QP_N$ to the channels $C_1 \ldots C_N$. Each queuing policy determines what happens when multiple sends (e.g., data units such as packets or frames) are made on a single channel, but cannot all be sent immediately. A given queuing policy $QP_i$ may be matched by a software designer to the type of data being sent through the corresponding channel $C_i$. The nature of the queuing policy $QP_i$ may depend on the nature of the data being sent over the channel $C_i$. For example, real time streaming data, e.g., streaming audio or video, may have different requirements than non-streaming data. In the case of video channel $C_2$, two or more video frames may be captured from a camera at different times. Due to the real-time nature of streaming video data, an older frame may be useless and could be discarded in favor of a newer frame. Thus the video channel $C_2$ may use a queuing policy that selectively discards older images in favor of the newer images. A similar policy may be implemented for the audio channel $C_1$. For the file transfer channel $C_3$, by contrast, it may be more desirable to transmit every packet regardless of age. Consequently, the filer transfer channel $C_3$ may have a different queuing policy attached it. By way of example, the file transfer channel may have a queuing policy that buffers all packets that cannot be sent during the time quantum T.

Each channel $C_i$ may utilize the bandwidth portion $R_i$ that was assigned to it during the time quantum T. Referring again to FIG. 2, at 206 ready data may be transmitted for each channel $C_i$ that has any ready data to transmit. The amount of ready data transmitted at 206 for a given channel $C_i$ is generally greater than zero and less than or equal to the size $R_i$ of the reserved portion for the channel $C_i$. As used herein the term "ready data" refers to data that is available for transmission. Ready data may be available for transmission by virtue of being generated by the application. In some cases, such ready data may be transmitted during the time quantum T as soon as it is generated. In addition, ready data may be available by virtue of being stored in one or more buffers 111. Generally, the buffers 111 may include N communication channel buffers $B_1 \ldots B_N$ correspondingly associated with communication channels $C_1 \ldots C_N$. In some embodiments, the router 150 may include buffers 111. As used herein, the term buffer generally refers to a region of computer memory used to temporarily hold data while it is being moved from one place to another. Buffers are used, e.g., when there is a difference between the rate at which data is received and the rate at which it can be processed, or in the case that these rates are variable. Typically, the data is stored in a buffer as it is retrieved from a source of the data (e.g., an input device or program generating the data) or just before it is sent to an output device (e.g., a network interface). In addition, a buffer may be used when moving data between processes within a computer. By way of example, each communication channel buffer may be implemented in hardware, software or some combination of both hardware and software. By way of example, and without limitation, the communication buffers $B_1 \ldots B_N$, may be implemented in software.

If a given channel $C_i$ does not use its entire reserved portion $R_i$ during the time quantum T, any unused part of the reserved portion $R_i$ may be redistributed to the other channels. By way of example, if not all of the ready data has been sent at 208 the scheduler 106 may determine at 210 whether there is any unused reserved portion $R_i$ to redistribute. If there is both unsent data and one or more unused reserved portions of the bandwidth quantum, then at 212 any unused part of any reserved portion $R_i$ may be redistributed amongst any of the N communication channels $C_1 \ldots C_N$ having un-transmitted ready data. Such redistribution may take place on a pro-rata basis based on relative priority. This sequence may repeat until all ready data has been sent or there is no unused portion of the bandwidth quantum BQ. Otherwise, the cycle may begin again, e.g., at normal distribution at 204 or (optionally) determination of a new bandwidth quantum BQ at 202. The cycle may then return repeat continually.

It is noted that the beginning and end of the cycle are somewhat arbitrary. For example, although from FIG. 2 it would appear that redistribution 212 takes place at the end of the time quantum T, redistribution may alternatively take place at the beginning of the time quantum T. Generally, redistribution may take place at some time after normal distribution and transmission in one time quantum and before normal distribution in the next time quantum.

Figure 3:
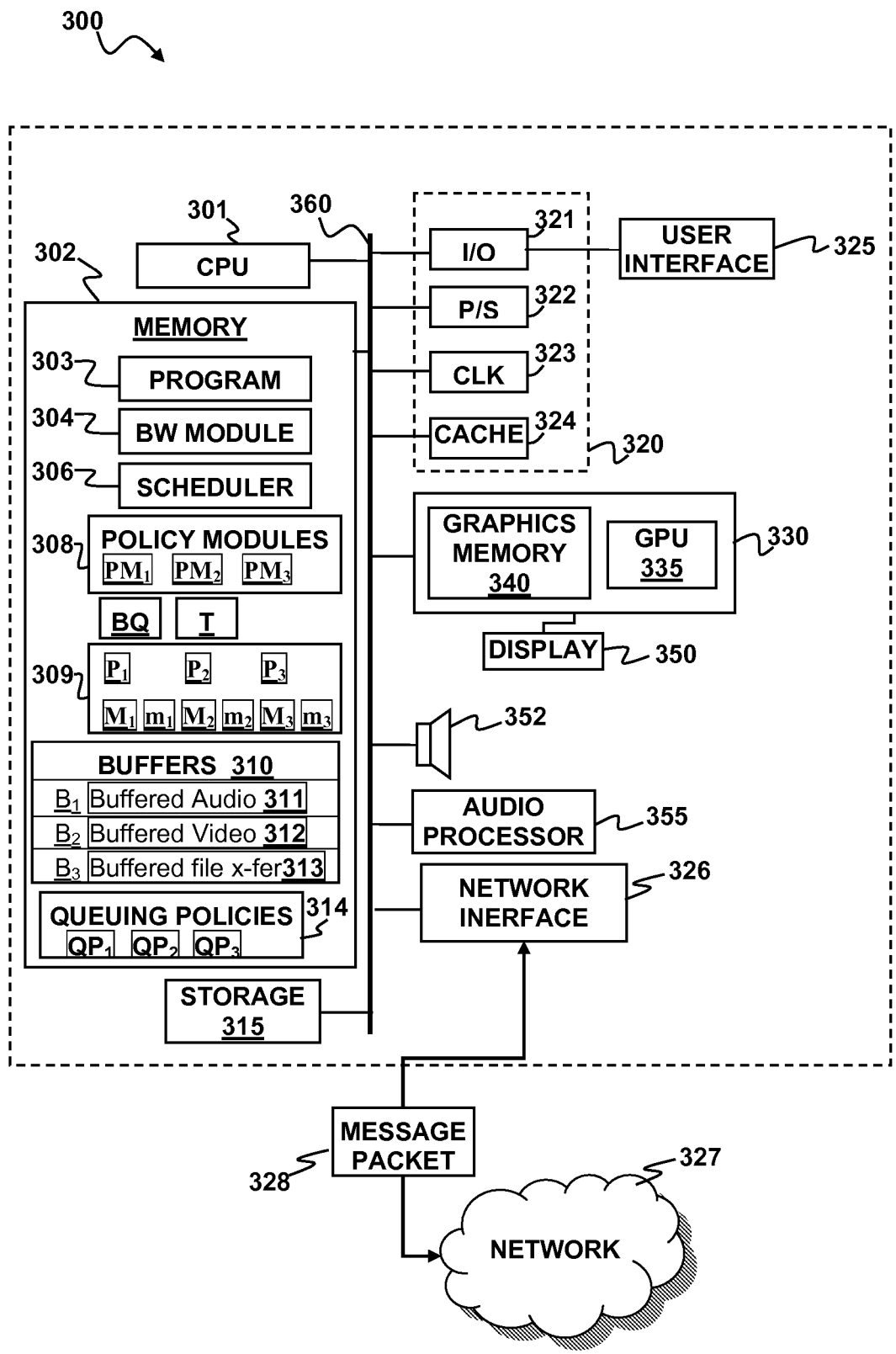
FIG. 3 is a block diagram of a node configured to implement network traffic prioritization according to an embodiment of the present invention.

FIG. 3 is a block diagram illustrating the components of a node 300 suitable for implementing network traffic prioritization according to an embodiment of the present invention. By way of example, and without loss of generality, the node 300 may be implemented as a computer system, such as a personal computer, video game console, personal digital assistant, or other digital device, suitable for practicing an embodiment of the invention. The node 300 may include a central processing unit (CPU) 301 configured to run software applications and optionally an operating system. The CPU 301 may include one or more processing cores. By way of example and without limitation, the CPU 301 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In the node 300 a memory 302 may be coupled to the CPU 301. The memory 302 may store applications and data for use by the CPU 301. The memory 302 may be in the form of an integrated circuit, e.g., RAM, DRAM, ROM, and the like). A computer program 303 may be stored in the memory 302 in the form of instructions that can be executed on the processor 301. The instructions of the program 303 may be configured to implement, amongst other things, one or more applications, such as the application 102 described above with respect to FIG. 1. By way of example, and without loss of generality, the program 303 may include an application, such as an A/V chat application involving two or more channels of communication. Such channels may include, but are not limited to an audio channel $C_1$, a video channel $C_2$ and a file transfer channel $C_3$. The memory 302 may also contain instructions, that, when executed by the CPU 301 implement a bandwidth module 304 having features in common with the bandwidth module 104 described above. The memory 302 may also contain instructions configured to implement a scheduler 306 having features in common with the scheduler 106 described above. The memory 302 may also contain instructions configured to implement one or more policy modules 308 having features in common with the policy modules 108 described above. By way of example and without loss of generality, the policy modules 308 may include an audio policy module $PM_1$ for the audio channel $C_1$, a video policy module $PM_2$ for the video channel $C_2$, and a file transfer policy $PM_3$ for the file transfer channel $C_3$.

The memory 302 may contain data that is generated by or usable by the program 303, and width module 304, scheduler 306, and policy modules 308. Specifically, such data may include, but is not limited to policy module parameters 309, a bandwidth quantum BQ and a time quantum T. The policy module parameters 309 may include priorities $P_1$, $P_2$, and $P_3$ respectively associated with the audio channel $C_1$, video channel $C_2$, and file transfer channel $C_3$. The policy module parameters 309 may further include minimum values $m_1$, $m_2$ and $m_3$ respectively associated with the audio channel $C_1$, video channel $C_2$ and file transfer channel $C_3$ as well as maximum values $M_1$, $M_2$ and $M_3$ respectively associated with the audio channel $C_1$, video channel $C_2$ and file transfer channel $C_3$.

In addition, the memory 302 may be configured to include one or more buffers 310 for data generated by the program 303 for transmission via the communication channels. By way of example and without loss of generality, the buffers 310 may include an audio buffer B1 configured to buffer audio channel data 311, a video buffer $B_2$ configured to buffer video channel data 312 and a file transfer buffer $B_3$ configured to buffer file transfer channel data 313. The scheduler 306 may be configured, e.g., by appropriate programming, to implement buffering of data in accordance with one or more queuing policies 314. By way of example, and without loss of generality, the queuing policies 314 may include an audio data queuing policy $QP_1$, a video data queuing policy $QP_2$ and a file transfer queuing policy $QP_3$. The queuing policies 314 may be configured, to determine what happens when multiple sends are made on a single channel, but cannot all be sent immediately, e.g., as described above.

The node 300 may further include a storage device 315 that provides non-volatile storage for applications and data. By way of example, the storage device 315 may be a fixed disk drive, removable disk drive, flash memory device, tape drive, CD-ROM, DVD-ROM, Blu-ray, HD-DVD, UMD, or other optical storage devices. The node 300 may also include well-known support functions 320 commonly used in computing systems. Such support functions may include such features as input/output (I/O) elements 321, power supplies (P/S) 322, a clock (CLK) 323 and cache 324.

One or more user input devices 325 may be used to communicate user inputs from one or more users to the node 300. By way of example, one or more of the user input devices 325 may be coupled to the node 300 via the I/O elements 321. Examples of suitable input devices 325 include keyboards, mice, joysticks, touch pads, touch screens, light pens, still or video cameras, and/or microphones. In the particular case of A/V chat, it is desirable for the user interface devices 325 to include both a camera and a microphone. A network interface 326 allows the node 300 to communicate with other computer systems via an electronic communications network 327. The network interface 326 may include wired or wireless communication over local area networks and wide area networks such as the Internet. The node 300 may send and receive data and/or requests for files via one or more message packets 328 over the network 327.

The node 300 may further comprise a graphics subsystem 330, which may include a graphics processing unit (GPU) 335 and graphics memory 340. The graphics memory 340 may include a display memory (e.g., a frame buffer) used for storing pixel data for each pixel of an output image. The graphics memory 340 may be integrated in the same device as the GPU 335, connected as a separate device with GPU 335, and/or implemented within the memory 302. Pixel data may be provided to the graphics memory 340 directly from the CPU 301. Alternatively, the CPU 301 may provide the GPU 335 with data and/or instructions defining the desired output images, from which the GPU 335 may generate the pixel data of one or more output images. The data and/or instructions defining the desired output images may be stored in buffers 310 and/or graphics memory 340. In an embodiment, the GPU 335 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 335 may further include one or more programmable execution units capable of executing shader programs.

The graphics subsystem 330 may periodically output pixel data for an image from graphics memory 340 to be displayed on a display device 350. The display device 350 may be any device capable of displaying visual information in response to a signal from the computer system 300, including CRT, LCD, plasma, and OLED displays. The node 300 may provide the display device 350 with an analog or digital signal. By way of example, the display 350 may include a cathode ray tube (CRT) or flat panel screen that displays text, numerals, graphical symbols, or images. In addition, the node 300 may include one or more audio speakers 352 that produce audible or otherwise detectable sounds. To facilitate generation of such sounds, the node 300 may further include an audio processor 355 adapted to generate analog or digital audio output from instructions and/or data provided by the CPU 301, memory 302, and/or storage 315. In the particular case of A/V chat, it is desirable for the node 300 to include a graphical display device 350 and an audio speaker 352.

The components of the node 300, including the CPU 301, memory 302, support functions 320, data storage 315, user input devices 325, network interface 326, graphics subsystem 330 speaker 352 and audio processor 355 may be operably connected to each other via one or more data buses 360. These components may be implemented in hardware, software, firmware or some combination of two or more of these.

By way of example, and without loss of generality, software designers may implement embodiments of the present invention in software applications by creating a plurality of communication channels, and assigning a priority and a queuing policy to each one. Data could then be sent through these configured communication channels and the scheduler 306, policy modules 308, and queuing policies 314 may control the actual transmission of the data over the network 327.

Figure 4:
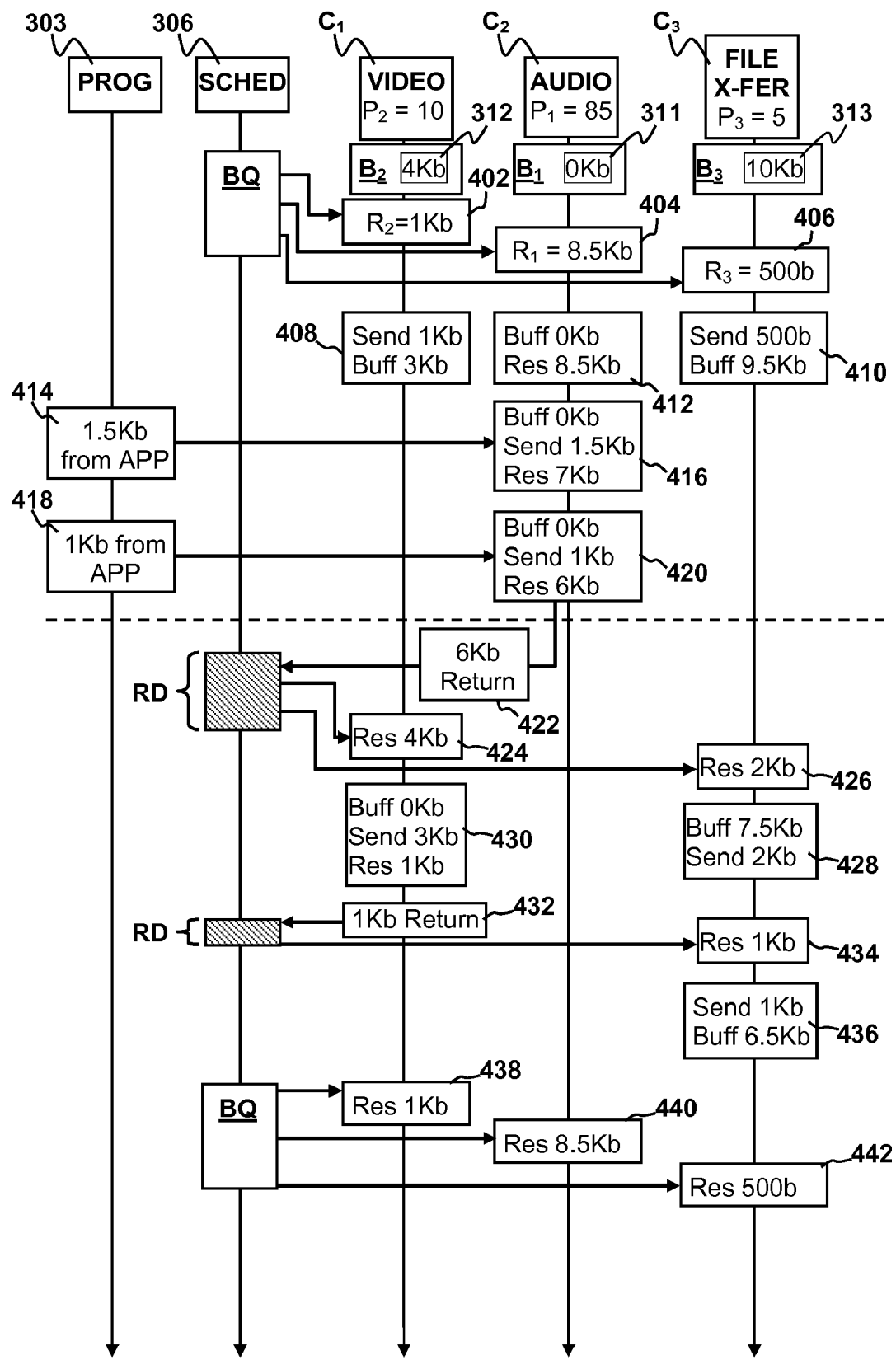
FIG. 4 is a flow diagram illustrating a particular example of prioritizing network traffic amongst audio, video and file transfer channels in a node of the type shown in FIG. 3 according to an embodiment of the present invention.

FIG. 4 illustrates an example of operation of the operation of a node of the type shown in FIG. 3. In the example illustrated in FIG. 4 it is assumed, for the purpose of example, that the audio buffer $B_1$ contains no buffered audio data 311, the video buffer $B_2$ contains 4 Kb of buffered video data 312 and the file transfer buffer $B_3$ contains 10 Kb of buffered data 313 for file transfer. It is also assumed, for the sake of simplicity, that there is no unreserved bandwidth quantum at the beginning of a time quantum T1. In this example, the audio channel $C_1$ has been assigned a priority value $P_1=85$, the video channel $C_2$ has been assigned a priority value $P_2=10$ and the file transfer channel $C_3$ has been assigned a priority value $P_3=5$. It is assumed in FIG. 4, that the size of the available bandwidth for one or more 20 millisecond time quanta has been determined by the bandwidth module 304 to be 500 Kbps. The scheduler 306 therefore determines that the corresponding bandwidth quantum is 10 Kb. Using the formula described above, the scheduler 306 may calculate relative priorities $P_{rel}^1=0.85$, $P_{rel}^2=0.10$ and $P_{rel}^3=0.05$ for the audio channel $C_1$, video channel $C_2$ and file transfer channel $C_3$, respectively. In accordance with the formula $R_i=(P_{rel}^i)(BQ)$, the scheduler 306 may then reserve portions of the bandwidth quantum BQ of $R_2=1$ Kb for the video channel $C_2$, $R_1=8.5$ Kb for the audio channel $C_1$ and $R_3=500$ b for the file transfer channel $C_2$ as indicated at 402, 404 and 406 respectively. The scheduler 306 may then cause the node 300 to send 1 Kb of the buffered video data 312 and buffer the remaining 3 Kb as indicated at 408. Similarly, the scheduler 306 may then cause the node 300 to send 500 b of the buffered file transfer data 313 and buffer the remaining 9.5 Kb as indicated at 410. If no audio data is available, the scheduler 306 may continue to reserve 8.5 Kb for the audio channel $C_3$ as indicated at 412. At some later point during the time quantum T1 the program 303 may generate 1.5 Kb of audio data for the audio channel $C_1$ as indicated at 414. This data may be sent over the audio channel $C_1$ while reserving the remaining (8.5 Kb−1.5 Kb)=7 Kb as indicated at 416. At some further point in the time quantum T1 an additional 1 Kb of audio data may be generated by the program 303 as indicated at 418. This data may be sent over the audio channel $C_1$ while reserving (7 Kb−1 Kb)=7 Kb as indicated at 420.

At some point the time quantum T1 ends and a new time quantum T2 begins. In this example, 6 Kb remains from the reserved portions $R_1$, $R_2$, $R_3$ of the bandwidth quantum BQ. This remaining portion may be returned for redistribution at the beginning of the new time quantum T2 as indicated at 422. The 6 Kb of returned reserved portion provides a redistribution quantum RD that may be distributed on a pro-rata basis amongst any of the channels $C_1$, $C_2$ $C_3$ having un-transmitted ready data, e.g., buffered data.

In this example, the video channel $C_2$ has 3 Kb of buffered data and the file transfer channel $C_3$ has 9.5 Kb of buffered data at the beginning of the new time quantum T2. Since the audio channel $C_1$ has no buffered data at this point, the 6 Kb of unused reserved portion is distributed between the video channel $C_2$ and the file transfer channel $C_3$. In this example, the priority $P_2$ for the video channel $C_2$ is twice as large as the priority for the file transfer channel $C_3$. The scheduler 306 may therefore reserve 4 Kb of the redistribution quantum RD for the video channel $C_2$ as indicated at 424 and 2 Kb of the redistribution quantum RD for the file transfer channel $C_3$ as indicated at 426. The scheduler 306 may then cause the node 300 to send 2 Kb of buffered file transfer data 313 as indicated at 428. The remaining 3 Kb of buffered video data 312 may be sent and the leftover 1 Kb reserved as indicated at 430. The leftover 1 Kb may be returned to the redistribution quantum RD as indicated at 432. Since, at this point, only the file transfer channel $C_3$ has buffered data, the entire 1 Kb of the redistribution quantum RD may be reserved for the file transfer channel $C_3$ as indicated at 434. The scheduler 306 may then cause the node 300 to send 1 Kb of buffered file transfer data 313 while buffering the remaining 6.5 Kb as indicated at 436.

At this point in this example, the entire bandwidth quantum BQ has been used and normal distribution may take place for the new time quantum T2. For example, if the sizes of the time quantum and available bandwidth are the same as before, 1 Kb may be reserved for the video channel $C_2$ at 438, 8.5 Kb may be reserved for the audio channel $C_1$ at 440 and 500 b may be reserved for the file transfer channel $C_3$ at 442. The reserved portions $R_1$, $R_2$, and $R_3$ may be used during the remainder of the new time quantum T2 in a manner similar to that described above with respect to the previous time quantum T2. Any unused reserved portions may be redistributed at the beginning of a subsequent time quantum.

Although the discussion of FIG. 4 is directed to an example involving three specific communication channels, those of skill in the art will recognize that the concept illustrated in that example may be applied to two channels or more than three channels in any similarly configured node.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. In the claims that follow, the expressions first and second are used to distinguish between different elements and do not imply any particular order or sequence. The appended claims are not to be interpreted as including means-plus-function limitations, unless such a limitation is explicitly recited in a given claim using the phrase "means for."

What is claimed is:

1. In a node configured to communicate with one or more other nodes over a network, a method for prioritizing network traffic among two or more distinct channels of communication within a single application, the method comprising:
   a) distributing a bandwidth quantum BQ for a time quantum T amongst $N \geq 2$ communication channels $C_1 \ldots C_N$, based on priorities $P_1 \ldots P_N$ correspondingly assigned to channels $C_1 \ldots C_N$, wherein each channel is assigned a reserved portion of the bandwidth quantum BQ, wherein a size $R_i$ of the reserved portion assigned to a given channel $C_i$ of the N channels $C_1 \ldots C_N$, is greater than zero and wherein $R_i$ is determined based on the corresponding priority $P_i$ assigned to the given channel $C_i$;
   b) transmitting an amount of ready data, if any, for each channel $C_i$ that is greater than zero and less than or equal to the size $R_i$ of the reserved portion for that channel; and
   c) redistributing any unused part of any reserved portion $R_i$ amongst any of the N communication channels $C_1 \ldots C_N$ having un-transmitted ready data.

2. The method of claim 1 wherein the size $R_i$ of a given reserved portion is determined by:

$$R_i = BQ \cdot \frac{P_i}{\sum_j P_j}, \text{ where } \sum_j P_j$$

is a sum of the priorities for all of the two or more channels.

3. The method of claim 1, wherein c) takes place before a) and wherein c) includes redistributing any unused part of any reserved portion $R_i$ from a previous time quantum amongst any of the two or more communication channels having un-transmitted buffered data.

4. The method of claim 1, further comprising determining the bandwidth quantum BQ prior to a).

5. The method of claim 1 wherein the two or more communications channels include an audio channel, a video channel, and a file transfer channel.

6. The method of claim 1, further comprising, if the size $R_i$ assigned to a given channel $C_i$ is greater than a predetermined maximum size $M_i$ for the channel $C_i$, allocating a difference $R_i - M_i$ to one or more other channels.

7. The method of claim 1, further comprising, if the size $R_i$ for a given channel $C_i$ is less than a predetermined minimum size $m_i$ for the channel $C_i$, excluding from a) any channels with lower priority than $C_i$ until the minimum size $m_i$ has been met.

8. The method of claim 7 wherein if more than one of the channels has a predetermined minimum size, a) includes initially distributing the bandwidth quantum BQ to a highest priority channel with a minimum size and any other channels having a higher priority.

9. The method of claim 1 wherein a) comprises determining each priority $P_i$ according to a predetermined policy module for the corresponding channel $C_i$.

10. The method of claim 9, wherein a) further comprises assigning a maximum and/or minimum value to the size $R_i$ according to the predetermined policy module.

11. The method of claim 1, wherein a) further comprises assigning a maximum and/or minimum value to the size $R_i$ according to a predetermined policy module for the corresponding channel $C_i$.

12. The method of claim 1 wherein the single application is an audio-video chat application.

13. The method of claim 1, wherein b) further comprises implementing a queuing policy for one or more of the communication channels $C_1 \ldots C_N$.

14. The method of claim 13 wherein implementing the queuing policy includes buffering one or more data units by a given communication channel $C_i$ that cannot be transmitted during the time quantum T.

15. The method of claim 13 wherein implementing the queuing policy includes discarding an older data unit in favor of a new data unit.

16. The method of claim 15 wherein the older data unit and new data unit comprise audio frames or video frames.

17. A node configured to communicate with one or more other nodes over a network, the node comprising:
   a processor; and
   a memory coupled to the processor, the memory having therein a set of instructions executable by the processor, the instructions being configured to implement a method for prioritizing network traffic among two or more distinct channels of communication within a single application, the method comprising:
   a) distributing a bandwidth quantum BQ for a time quantum T amongst $N \geq 2$ communication channels $C_1 \ldots C_N$, based on priorities $P_1 \ldots P_N$ correspondingly assigned to channels $C_1 \ldots C_N$, wherein each channel is assigned a reserved portion of the bandwidth quantum BQ, wherein a size $R_i$ of the reserved portion assigned to a given channel $C_i$ of the N channels $C_1 \ldots C_N$, is greater than zero and wherein $R_i$ is determined based on the corresponding priority $P_i$ assigned to the given channel $C_i$;
   b) transmitting an amount of ready data, if any, for each channel $C_i$ that is greater than zero and less than or equal to the size $R_i$ of the reserved portion for that channel; and
   c) redistributing any unused part of any reserved portion $R_i$ amongst any of the N communication channels $C_1 \ldots C_N$ having un-transmitted ready data.

18. The node of claim 17, further comprising one or more instructions in memory configured to implement one or more policy modules configured to determine the priorities $P_1 \ldots P_N$ for the corresponding channels $C_1 \ldots C_N$.

19. The node of claim 18, wherein one or more of the policy modules is configured to assign a maximum and/or minimum size to an amount of data that can be transmitted during the time quantum T on one or more of the channels $C_1 \ldots C_N$.

20. The node of claim 18, wherein one or more of the policy modules is configured to assign a maximum and size $M_i$ to an amount of data that can be transmitted during the time quantum T over a given channel $C_i$, wherein the set of instructions is configured to allocate a difference $R_i - M_i$ from a given channel $C_i$ to one or more other channels if the size $R_i$ assigned to the given channel $C_i$ is greater than the maximum size $M_i$.

21. The node of claim 18, wherein one or more of the policy modules is configured to assign a minimum size $m_i$ to an amount of data that can be transmitted during the time quantum T over a given channel $C_i$, wherein the set of instructions is configured to exclude from a) any channels with lower priority than a channel $C_i$ until an amount of data greater than or equal to the minimum size $m_i$ has been sent over the channel $C_i$.

22. The node of claim 21, wherein the set of instructions is configured such that a) includes initially distributing the bandwidth quantum BQ to a highest priority channel with a minimum size and any other channels having a higher priority if more than one of the channels is assigned a minimum size to an amount of data that can be transmitted during the time quantum T.

23. The node of claim 17, wherein the set of instructions is configured such that b) further comprises implementing a queuing policy for one or more of the communication channels $C_1 \ldots C_N$.

24. The node of claim 23, wherein the set of instructions is configured such that implementing the queuing policy includes buffering one or more data units by a given communication channel $C_i$ that cannot be transmitted during the time quantum T.

25. The node of claim 23, wherein the set of instructions is configured such that implementing the queuing policy includes discarding an older data unit in favor of a newer data unit.

26. The node of claim 25 wherein the older data unit and newer data unit comprise one or more audio frames or video frames.

27. The node of claim 17 wherein the single application is an audio-video chat application.

28. The node of claim 17 wherein the two or more communications channels include an audio channel, a video channel, and a file transfer channel.

29. The node of claim 17, further comprising a bandwidth module configured to determine the bandwidth quantum BQ.

30. A non-transitory storage medium comprising program instructions, wherein the program instructions are computer-executable on a node to implement a method for prioritizing network traffic among two or more distinct channels of communication within a single application, the method comprising:
   a) distributing a bandwidth quantum BQ for a time quantum T amongst $N \geq 2$ communication channels $C_1 \ldots C_N$, based on priorities $P_1 \ldots P_N$ correspondingly assigned to channels $C_1 \ldots C_N$, wherein each channel is assigned a reserved portion of the bandwidth quantum BQ, wherein a size $R_i$ of the reserved portion assigned to a given channel $C_i$ of the N channels $C_1 \ldots C_N$, is greater than zero and wherein $R_i$ is determined based on the corresponding priority $P_i$ assigned to the given channel $C_i$;
   b) transmitting an amount of ready data, if any, for each channel $C_i$ that is greater than zero and less than or equal to the size $R_i$ of the reserved portion for that channel; and
   c) redistributing any unused part of any reserved portion $R_i$ amongst any of the N communication channels $C_1 \ldots C_N$ having un-transmitted ready data.

* * * * *